(12) United States Patent
Woo et al.

(10) Patent No.: US 8,310,642 B2
(45) Date of Patent: Nov. 13, 2012

(54) LIQUID CRYSTAL DISPLAY WITH TEXTURE CONTROL PORTION BETWEEN PIXEL AND COMMON ELECTRODES AND METHOD THEREOF

(75) Inventors: Hwa-sung Woo, Suwon-si (KR); Yong-hwan Shin, Yongin-si (KR); Sung-woon Kim, Suwon-si (KR); Hee-seop Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 725 days.

(21) Appl. No.: 12/121,877

(22) Filed: May 16, 2008

(65) Prior Publication Data

US 2009/0066891 A1 Mar. 12, 2009

(30) Foreign Application Priority Data

Sep. 12, 2007 (KR) .................. 10-2007-0092716

(51) Int. Cl.
*G02F 1/1343* (2006.01)
*G02F 1/1335* (2006.01)
*G02F 1/1339* (2006.01)

(52) U.S. Cl. ............ 349/144; 349/141; 349/156
(58) Field of Classification Search ......... 349/141, 349/156, 144
See application file for complete search history.

(56) References Cited

U.S. PATENT DOCUMENTS

| 6,266,116 B1* | 7/2001 | Ohta et al. ............... 349/141 |
| 6,429,914 B1* | 8/2002 | Kubota et al. ............ 349/86 |
| 6,583,840 B1* | 6/2003 | Inoue et al. ............. 349/141 |
| 2002/0047974 A1* | 4/2002 | Matsumoto ............... 349/141 |
| 2002/0063822 A1* | 5/2002 | Kondo et al. ............ 349/106 |
| 2002/0159016 A1* | 10/2002 | Nishida et al. .......... 349/141 |

FOREIGN PATENT DOCUMENTS

| JP | 11-231344 | 8/1999 |
| KR | 100301034 B1 | 6/2001 |
| KR | 100375732 B1 | 2/2003 |

* cited by examiner

*Primary Examiner* — Hoan C Nguyen
(74) *Attorney, Agent, or Firm* — Cantor Colburn LLP

(57) ABSTRACT

A liquid crystal display ("LCD") having controlled texture and reduced response time includes first and second insulation substrates which are separated from each other and face each other, a liquid crystal layer which is interposed between the first and second insulation substrates and has liquid crystal molecules, a pixel electrode which is disposed on the first insulation substrate and includes a plurality of first linear electrode patterns, a common electrode which is disposed on the first insulation substrate and includes a plurality of second linear electrode patterns separated from the first linear electrode patterns by a predetermined gap, and a texture control portion which is disposed in an area corresponding to the gap and formed on the first or second insulation substrate, wherein the first and second linear electrode patterns are arranged in an alternating fashion.

25 Claims, 12 Drawing Sheets

LIQUID CRYSTAL DISPLAY WITH TEXTURE CONTROL PORTION BETWEEN PIXEL AND COMMON ELECTRODES AND METHOD THEREOF

This application claims priority to Korean Patent Application No. 10-2007-0092716, filed on Sep. 12, 2007, and all the benefits accruing therefrom under 35 USC §119, the contents of which in its entirety are herein incorporated by reference.

BACKGROUND OF THE INVENTION

1. Field of the Invention

The present invention relates to a liquid crystal display ("LCD") and method thereof, and more particularly, to an LCD having controlled texture and reduced response time, and a method of reducing response time of the LCD.

2. Description of the Related Art

Liquid crystal displays ("LCDs") are one of the most widely used flat displays. Generally, an LCD includes a pair of display panels having electric field-generating electrodes, such as pixel electrodes and common electrodes, and a liquid crystal layer interposed between the display panels. In an LCD, voltages are applied to electric field-generating electrodes to generate an electric field. Accordingly, the alignment of liquid crystal molecules of a liquid crystal layer is determined, and polarized light of incident light is controlled. As a result, a desired image is displayed on the LCD.

One of the drawbacks of LCDs is a narrow viewing angle as compared to other conventional displays such as cathode ray tubes ("CRTs"). Thus, research has been conducted on LCDs having wide viewing angles. LCDs having wide viewing angles include electrically-induced optical compensation ("EOC") mode LCDs, in-plane switching ("IPS") mode LCDs, and vertical alignment ("VA") mode LCDs.

BRIEF SUMMARY OF THE INVENTION

It has been determined herein, according to the present invention, that the conventional liquid crystal displays ("LCDs") having wide viewing angles still have problems of texture and long response time.

Aspects of the present invention provide an LCD having controlled texture and reduced response time. Aspects of the present invention also provide a method of reducing response time of LCDs.

According to exemplary embodiments of the present invention, there is provided an LCD including first and second insulation substrates which are separated from each other and face each other, a liquid crystal layer which is interposed between the first and second insulation substrates and includes liquid crystal molecules, a pixel electrode which is disposed on the first insulation substrate and includes a plurality of first linear electrode patterns, a common electrode which is disposed on the first insulation substrate and includes a plurality of second linear electrode patterns separated from the first linear electrode patterns by a predetermined gap, and a texture control portion which is disposed in an area corresponding to the gap and formed on the first or second insulation substrate, wherein the first and second linear electrode patterns are arranged in an alternating fashion.

According to other exemplary embodiments of the present invention, a method of reducing response time of liquid crystal molecules in an LCD includes interposing the liquid crystal molecules between first and second insulation substrates, disposing a pixel electrode on the first insulation substrate, the pixel electrode including a plurality of first linear electrode patterns, disposing a common electrode on the first insulation substrate, the common electrode including a plurality of second linear electrode patterns separated from the first linear electrode patterns by a gap and arranged in an alternating fashion with the first linear electrode patterns, and disposing a texture control portion in an area corresponding to the gap on the first or second insulation substrate, wherein the liquid crystal molecules are arranged perpendicular to the texture control portion when driving voltage is applied to the LCD.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
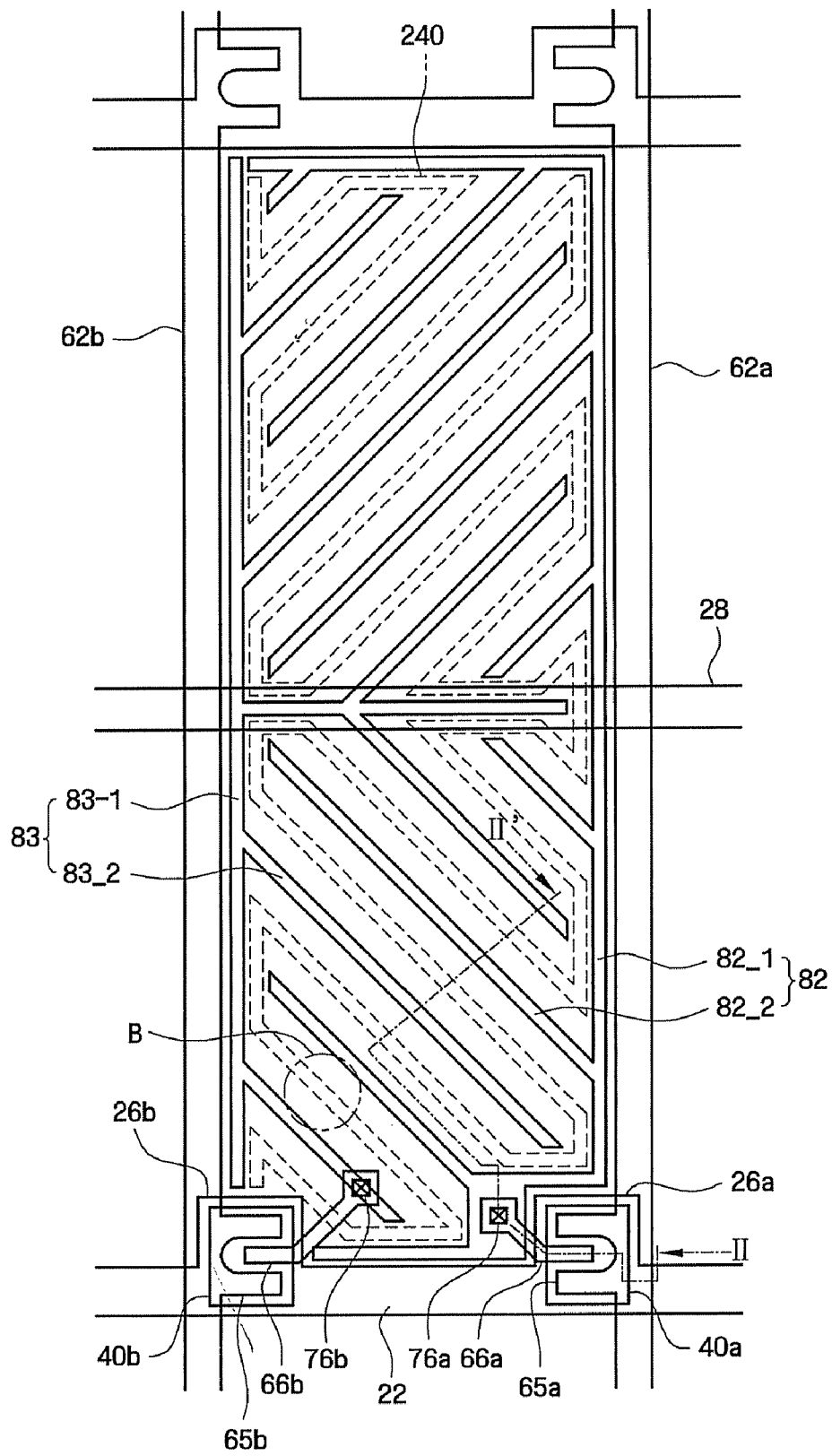
FIG. 1 is an arrangement plan of an exemplary liquid crystal display ("LCD") according to a first exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals in the drawings denote like elements, and thus their description will be omitted.

It will be understood that when an element or layer is referred to as being "on" another element or layer, it can be directly on the other element or layer or intervening elements or layers may be present. In contrast, when an element is referred to as being "directly on" another element or layer, there are no intervening elements or layers present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Figure 2:
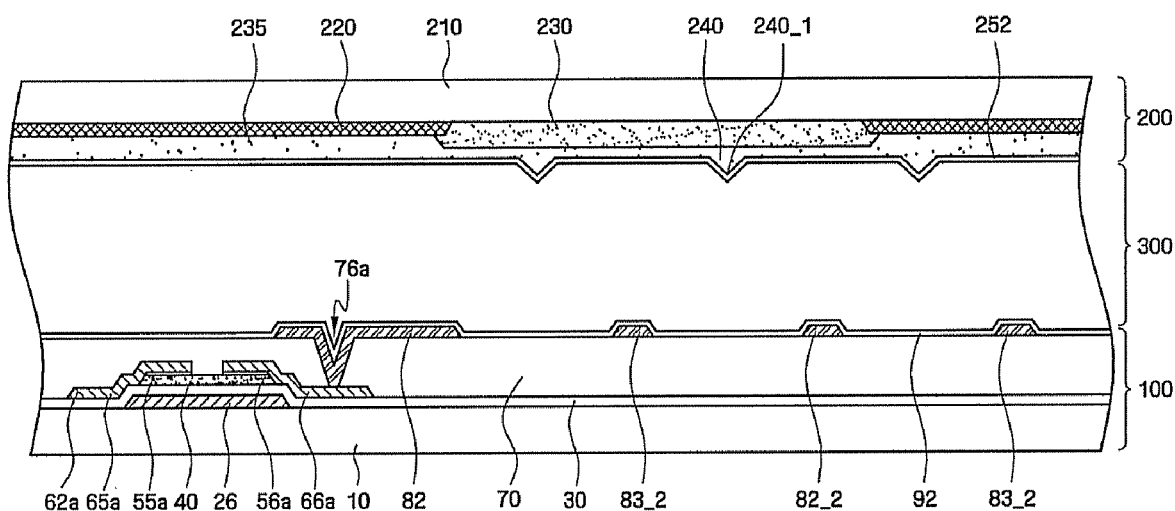
FIG. 2 is a cross-sectional view of the exemplary LCD taken along line II-II' of FIG. 1.

Hereinafter, a liquid crystal display ("LCD") according to a first exemplary embodiment of the present invention will be described with reference to FIGS. 1 and 2. FIG. 1 is an arrangement plan of an exemplary LCD according to a first exemplary embodiment of the present invention. FIG. 2 is a cross-sectional view of the exemplary LCD taken along line II-II' of FIG. 1.

Referring to FIGS. 1 and 2, the exemplary LCD according to the first exemplary embodiment of the present invention includes a thin-film transistor ("TFT") display substrate 100, a color filter display substrate 200 facing the TFT display substrate 100, a liquid crystal layer 300 interposed between the TFT display substrate 100 and the color filter display substrate 200, and a backlight assembly (not shown).

A gate line 22 is formed on a first insulation substrate 10 of the TFT display substrate 100 included in the LCD according to the first exemplary embodiment. The gate line 22 extends horizontally, such as in a first direction, and transmits a gate signal. The gate line 22 is allocated to each pixel within a row of pixels and includes a pair of first and second protruding gate electrodes 26*a* and 26*b*. The gate line 22 and the first and second gate electrodes 26*a* and 26*b* are collectively referred to as gate wiring.

In addition, storage wiring 28 is formed on the first insulation substrate 10. The storage wiring 28 extends horizontally, also in the first direction, and substantially parallel to the gate line 22. The storage wiring 28 may be partially overlapped by a pixel electrode 82, which will be described later, in a pixel. In the first exemplary embodiment shown in FIG. 1, an area in which the storage wiring 28 overlaps the pixel electrode 82 is narrow. However, the present invention is not limited thereto. The storage wiring 28 may have various shapes and may be disposed at various locations as long as the storage wiring 28 and the pixel electrode 82 can overlap each other to form predetermined storage capacitance.

Each of the gate wiring 22, 26*a* and 26*b* and the storage wiring 28 may be made of an aluminum (Al)-based metal, such as Al or an Al alloy, a silver (Ag)-based metal, such as Ag or an Ag alloy, a copper (Cu)-based metal such as Cu or a Cu alloy, a molybdenum (Mo)-based metal such as Mo or a Mo alloy, chrome (Cr), titanium (Ti), or tantalum (Ta). In addition, each of the gate wiring 22, 26*a* and 26*b* and the storage wiring 28 may have a multi-layered structure composed of two conductive layers (not shown) with different physical characteristics. In an embodiment having a multi-layered structure, one of the two conductive layers is made of a metal with low resistivity, such as an Al-based metal, an Ag-based metal or a Cu-based metal, in order to reduce a signal delay or a voltage drop of each of the gate wiring and the storage wiring 28, and the other one of the conductive layers is made of a different material, in particular, a material having superior contact characteristics with indium tin oxide ("ITO") and indium zinc oxide ("IZO"), such as a Mo-based metal, chrome, titanium, or tantalum. Examples of the multi-layered structure may include a double-layered structure composed of a combination of a lower chrome layer and an upper Al layer or a combination of a lower Al layer and an upper Mo layer. However, the present invention is not limited thereto. The gate wiring 22, 26*a* and 26*b* and the storage wiring 28 may be formed of various metals and conductors.

A gate insulating film 30, which is made of silicon nitride (SiNx) or silicon oxide (SiOx), is formed on the gate wiring 22, 26a and 26b, and the storage wiring 28, and may be further formed on exposed portions of the first insulation substrate 10.

A pair of semiconductor layers 40a and 40b, which are made of hydrogenated amorphous silicon ("a-Si") or polycrystalline silicon, are formed on the gate insulating film 30. The semiconductor layers 40a and 40b may have various shapes. For example, the semiconductor layers 40a and 40b may be shaped like islands as shown in FIG. 1. In an alternative exemplary embodiment, the semiconductor layers 40a and 40b may be linear in shape, and may be disposed under first and second data lines 62a and 62b and extend onto the first and second gate electrodes 26a and 26b.

Ohmic contact layers 55a and 56a made of a material, such as silicide or n+ hydrogenated a-Si doped with n-type impurities in high concentration, are formed on the semiconductor layers 40a and 40b, respectively. The ohmic contact layers 55a and 56a may have various shapes. For example, the ohmic contact layers 55a and 56a may be shaped like islands as shown in FIG. 2. In this case, they may be disposed under a first drain electrode 66a and a first source electrode 65a, respectively. Although not shown, ohmic contact layers may also be disposed under a second drain electrode 66b and a second source electrode 65b. In an alternative exemplary embodiment, the ohmic contact layers 55a and 56a may be linear in shape, and may extend to under the first and second data lines 62a and 62b, respectively.

The first and second data lines 62a and 62b, the first drain electrode 66a, and the second drain electrode 66b are formed on the ohmic contact layers 55a and 56a and the gate insulating film 30.

The first and second data lines 62a and 62b extend vertically, such as in a second direction that extends substantially perpendicular to the first direction, and substantially parallel to each other and cross the gate line 22. The first source electrode 65a and a second source electrode 65b branch out from the first and second data lines 62a and 62b and extend onto the semiconductor layers 40a and 40b, respectively. The first and second drain electrodes 66a and 66b are separated from the first and second source electrodes 65a and 65b, respectively, and are disposed on the semiconductor layers 40a and 40b to face the first and second source electrodes 65a and 65b with respect to the first and second gate electrodes 26a and 26b, respectively.

The first drain electrode 66a is connected to the pixel electrode 82 by a first contact hole 76a, and the second drain electrode 66b is connected to a common electrode 83 by a second contact hole 76b. The first data line 62a applies a data voltage to the pixel electrode 82, and the second data line 62b applies a common voltage to the common electrode 83. The difference between the data voltage and the common voltage may be, for example, 5 to 15 V. Since the texture of the LCD according to the first exemplary embodiment of the present invention is efficiently controlled, even if there is a large difference between the data voltage and the common voltage, random motion can be prevented.

The first and second data lines 62a and 62b, the first and second source electrodes 65a and 65b, and the first and second drain electrodes 66a and 66b are collectively referred to as first data wiring and second data wiring, respectively.

Each of the first data wiring and the second data wiring may be made of a refractory metal such as chrome, a Mo-based metal, tantalum, or titanium. In addition, each of the first data wiring and the second data wiring may have a multi-layered structure composed of a lower layer (not shown), which is made of a refractory metal, and an upper layer (not shown) which is made of a material with low resistivity and is disposed on the lower layer. Examples of the multi-layered structure may include a double-layered structure composed of a combination of a lower chrome layer and an upper Al layer or a combination of a lower Al layer and an upper Mo layer. Alternatively, the multi-layered structure may be a triple-layered structure composed of Mo—Al—Mo layers. While particular examples are described for the first and second data wiring, the first and second data wiring may be made of various metals and conductors.

As described above, the first and second source electrodes 65a and 65b at least partially overlap the semiconductor layers 40a and 40b, respectively, and the first and second drain electrode 66a and 66b face the first and second source electrodes 66a and 66b with respect to the first and second gate electrodes 26a and 26b, respectively, and at least partially overlap the semiconductor layers 40a and 40b, respectively. Here, the ohmic contact layers 55a and 56a are interposed between the semiconductor layers 40a and 40b and the first and second source electrodes 65a and 65b, respectively, and between the semiconductor layer 40a and 40b and the first and second drain electrodes 66a and 66b, respectively, to reduce contact resistance between them.

A passivation layer 70, which is an insulation layer, is formed on the first and second data lines 62a and 62b, the first and second drain electrodes 66a and 66b, and the exposed semiconductor layers 40a and 40b. The passivation layer 70 may be further formed on exposed portions of the gate insulating film 30. The passivation layer 70 is made of an inorganic material such as silicon nitride or silicon oxide, an organic material having photosensitivity and superior planarization characteristics, or an insulating material, such as a-Si:C:O or a-Si:O:F, which is formed by plasma enhanced chemical vapor deposition ("PECVD"). The passivation layer 70 may have a double-layered structure composed of a lower inorganic layer and an upper organic layer in order to protect exposed portions of the semiconductor layers 40a and 40b while taking advantage of the superior characteristics of the organic layer.

The first and second contact holes 76a and 76b exposing the first and second drain electrodes 66a and 66b, respectively, are formed in the passivation layer 70.

The pixel electrode 82 is formed on the passivation layer 70 in each pixel. The pixel electrode 82 is electrically connected to the first drain electrode 66a through the first contact hole 76a. That is, the pixel electrode 82 is physically and electrically connected to the first drain electrode 66a via the first contact hole 76a and thus receives the data voltage from the first drain electrode 66a. The pixel electrode 82 may be made of a transparent conductor such as ITO or IZO.

The pixel electrode 82 includes a first connection pattern 82_1 and a plurality of first linear electrode patterns 82_2 branching out from the first connection pattern 82_1. The first connection pattern 82_1 may be formed along at least some of the edges of a pixel region to be parallel to the first data line 62a and the gate line 22. That is, the first connection pattern 82_1 may be generally rectangular shaped with one side removed, such as a block-shaped letter "C" facing backwards in the orientation shown in FIG. 1. The first linear electrode patterns 82_2 may be bar-shaped and branch out from the first connection pattern 82_1. The first linear electrode patterns 82_2 may be at an angle of about 45 degrees with respect to a polarization axis of a polarizer (not shown) which will be described later. If the polarization axis of the polarizer is parallel to the gate line 22 or the first and second data lines 62a and 62b, then the first linear electrode patterns 82_2 may be at an angle of about 225 or about 135 degrees with respect to the gate line 22.

However, the shapes and orientations of the first connection pattern 82_1 and the first linear electrode patterns 82_2 are not limited thereto. That is, the first connection pattern 82_1 and the first linear electrode patterns 82_2 may have various shapes as long as the bar-shaped first linear electrode patterns 82_2 separated from each other by a predetermined gap are formed.

The common electrode 83 is formed on the passivation layer 70 in each pixel. The common electrode 83 is electrically connected to the second drain electrode 66b through the second contact hole 76b. That is, the common electrode 83 is physically and electrically connected to the second drain electrode 66b via the second contact hole 76b and thus receives the common voltage from the second drain electrode 66b. Like the pixel electrode 82, the common electrode 83 may be made of a transparent conductor such as ITO or IZO.

The common electrode 83 includes a second connection pattern 83_1 and a plurality of second linear electrode patterns 83_2 branching out from the second connection pattern 83_1. The second connection pattern 83_1 may include a vertical portion formed along the edge of a pixel region to be parallel to the second data line 62b. In addition, the second connection pattern 83_1 may include a horizontal portion branching out from the vertical portion and horizontally dividing the pixel region into two domains. The horizontal portion of the second connection pattern 83_1 may overlap the storage wiring 28. That is, the second connection pattern 83_1 may be shaped like English character "T". The second linear electrode patterns 83_2 are bar-shaped and branch out from the second connection pattern 83_1, such as at angles of about 45 degrees with respect to the second connection pattern 83_1.

The first linear electrode patterns 82_2 and the second linear electrode patterns 83_2 are arranged in an alternating fashion and separated from each other by a predetermined gap g. The first linear electrode patterns 82_2 and the second linear electrode patterns 83_2 that are adjacent to each other may be parallel to each other. That is, like the first linear electrode patterns 82_2, the second linear electrode patterns 83_2 may be at an angle of 45 degrees with respect to the polarization axis of the polarizer (not shown) which will be described later. If the polarization axis of the polarizer is parallel to the gate line 22 or the first and second data lines 62a and 62b, the second linear electrode patterns 83_2 may be at an angle of 225 or 135 degrees with respect to the gate line 22.

However, the shapes and orientations of the second connection pattern 83_1 and the second linear electrode patterns 83_2 are not limited thereto. That is, the second connection pattern 83_1 and the second linear electrode patterns 83_2 may have various shapes as long as the bar-shaped second linear electrode patterns 83_2 separated from each other by a predetermined gap are formed.

In the first exemplary embodiment of the present invention, the data voltage applied to the pixel electrode 82 and the common voltage applied to the common electrode 83 form a horizontal electric field between the pixel electrode 82 and the common electrode 83. So that, the electric field substantially perpendicular to the pixel electrode 82 and the common electrode 83 is formed above the pixel electrode 82 and the common electrode 83. The electric field vertically aligns liquid crystal molecules in the liquid crystal layer 300 above the pixel electrode 82 and the common electrode 83. Since the transmittance of the LCD is reduced, widths (indicated by reference characters $w_2$ and $w_1$ in FIG. 4) of the pixel electrode 82 and the common electrode 83 may be narrow, and the gap g between the pixel electrode 82 and the common electrode 83 may be large. The gap g between the pixel electrode 82 and the common electrode 83 and the alignment of liquid crystal molecules according to the gap g will be described in more detail later.

A vertical alignment film 92, which can align liquid crystal molecules, may be formed on the pixel electrode 82, the common electrode 83 and the exposed portions of the passivation layer 70. The vertical alignment film 92 vertically aligns liquid crystal molecules, together with a vertical alignment film 252 of the color filter display substrate 200. The vertical alignment film 92 may be made of a material containing a main chain, for example, polyimide, and a side chain.

A polarizer (not shown) may be disposed on the first insulation substrate 10. Specifically, the polarizer may be formed on a surface of the first insulation substrate 10 opposite another surface thereof on which the pixel electrode 82 is formed, such as on a surface facing the backlight assembly. The polarization axis of the polarizer formed on the first insulation substrate 10 is perpendicular to that of a polarizer formed on a second insulation substrate 210. Therefore, when a driving voltage is not applied to the LCD, the LCD displays clear black due to the vertically aligned liquid crystal molecules.

A phase retardation compensation film (not shown) may be interposed between the first insulation substrate 10 and the polarizer. The phase retardation compensation film compensates for retardation of light that passes through the liquid crystal layer 300 to widen the viewing angle of the LCD.

The color filter display substrate 200 is disposed above the TFT display substrate 100 with a predetermined gap therebetween and faces the TFT display substrate 100. The size of the gap between the TFT display substrate 100 and the color filter display substrate 200 determines the thickness of the liquid crystal layer 300. The gap between the TFT display substrate 100 and the color filter display substrate 200 may be maintained by spacers (not shown).

A black matrix 220 is formed on the second insulation substrate 210 of the color filter display substrate 200. The black matrix 220 may outline a pixel region, prevent leakage of light, and enhance image quality. The black matrix 220 may be made of a metal (metal oxide), such as chrome or chrome oxide, or organic black resist. In order to maximize an aperture ratio, the black matrix 220 may overlap the gate wiring and/or the first and second data wiring. Spacers used to maintain a gap between the TFT display substrate 100 and the color filter display substrate 200 may be arranged between the black matrix 220 and the gate wiring and/or the first and second data wiring.

Color filters 230 of red (R), green (G) and blue (B) are sequentially arranged in the pixel regions outlined by the black matrix 220. The color filters 230 pass light in a predetermined wavelength band.

The color filters 230 may be made of a photosensitive organic material, such as photoresist. The color filters 230 may have equal thicknesses or predetermined step heights.

An overcoat layer 235 may be formed on the color filters 230 and the black matrix 220 in order to planarize the step heights of the color filters 230.

A texture control portion 240 is formed on the overcoat layer 235. The texture control portion 240 overlaps the gap g between the first linear electrode patterns 82_2 and the second linear electrode patterns 83_2. The texture control portion 240 according to the first exemplary embodiment may be a protrusion protruding in a direction away from the second insulation substrate 210 toward the liquid crystal layer 300. The protrusion may be formed by forming an organic or inorganic film on the overcoat layer 235 and patterning the organic or inorganic film. The protrusion may be bar-shaped and may extend in directions parallel to the first and second linear electrode patterns 82_2 and 83_2. The desirable shapes and conditions of the protrusion will be described in detail later.

The vertical alignment film 252 is formed on the overcoat layer 235 and the texture control portion 240. A spacer or plurality of spacers may be interposed between the TFT display substrate 100 and the color filter display substrate 200 in order to maintain a cell gap between them.

A polarizer may be formed on a surface of the second insulation substrate 210 opposite another surface thereof on which the color filters 230 are formed. A polarization axis of the polarizer formed on the second insulation substrate 210 is perpendicular to that of the polarizer formed on the first insulation substrate 10.

The liquid crystal layer 300 having liquid crystal molecules (indicated by reference numeral 310 in FIG. 4) is interposed between the TFT display substrate 100 and the color filter display substrate 200. The liquid crystal molecules 310 according to the present embodiment have positive dielectric anisotropy. That is, when a driving voltage is applied to the LCD according to the first exemplary embodiment, main directors of the liquid crystal molecules 310 are aligned according to the direction of an electric field. In general, liquid crystal molecules having positive dielectric anisotropy have a higher dielectric constant and lower viscosity than liquid crystal molecules having negative dielectric anisotropy. Since the liquid crystal molecules 310 according to the present exemplary embodiment have positive dielectric anisotropy, the response time of the LCD according to the present exemplary embodiment can be reduced. The thickness of the liquid crystal layer 300 having the liquid crystal molecules 310, that is, the cell gap between the TFT display substrate 100 and the color filter display substrate 200, may be about 3 to about 5 µm. If the cell gap of the LCD is as small as about 3 to about 5 µm, the response speed of the liquid crystal molecules 310 can be increased. This is because a smaller cell gap increases the difference Δn between refractive indices of the liquid crystal molecules 310, which, in turn, increases the number of liquid crystal molecules 310 having low viscosity. The liquid crystal molecules 310 may be nematic liquid crystals or chiral nematic liquid crystals.

Figure 3:
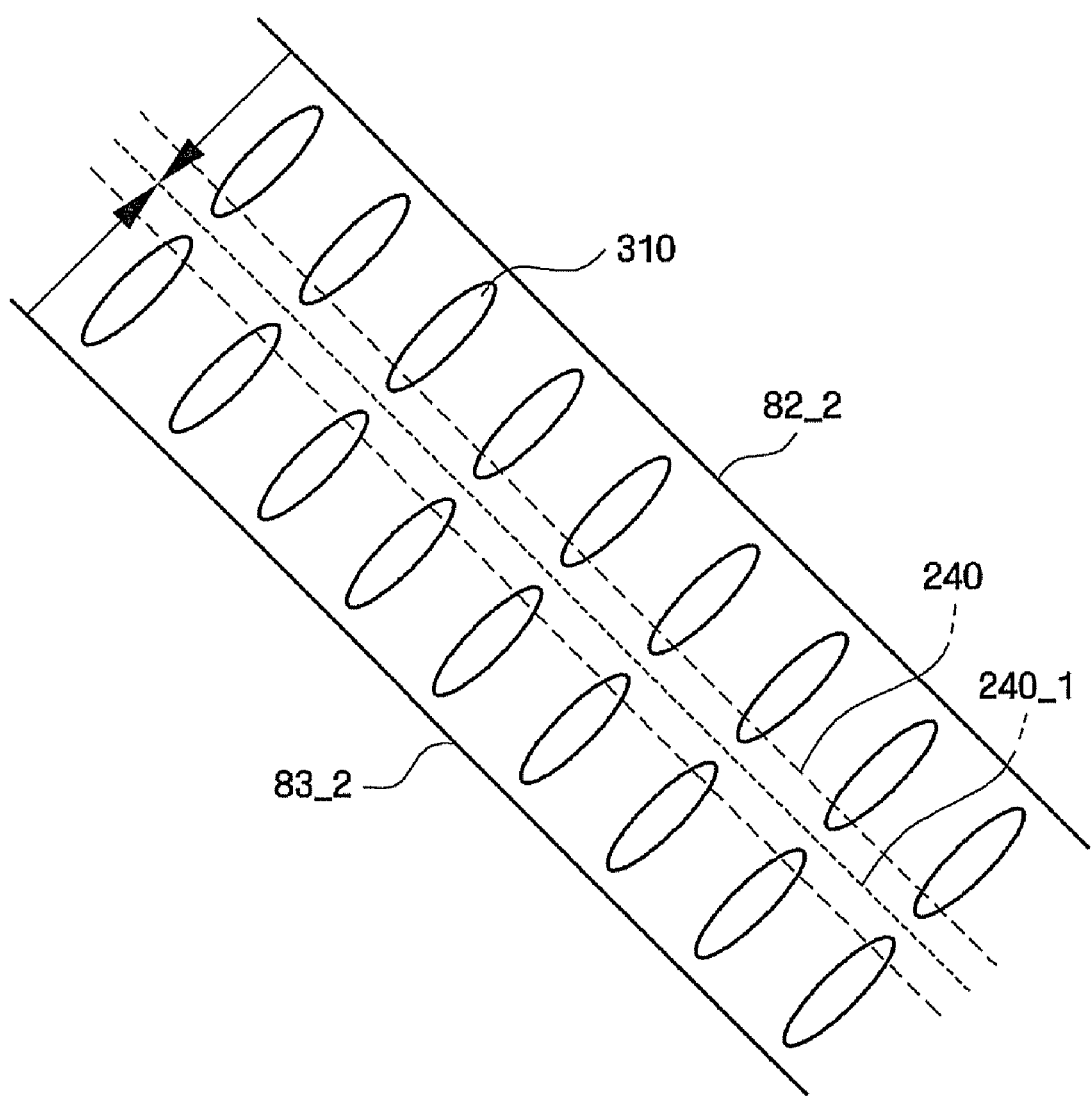
FIG. 3 is an enlarged view of portion B shown in FIG. 1.
Figure 4:
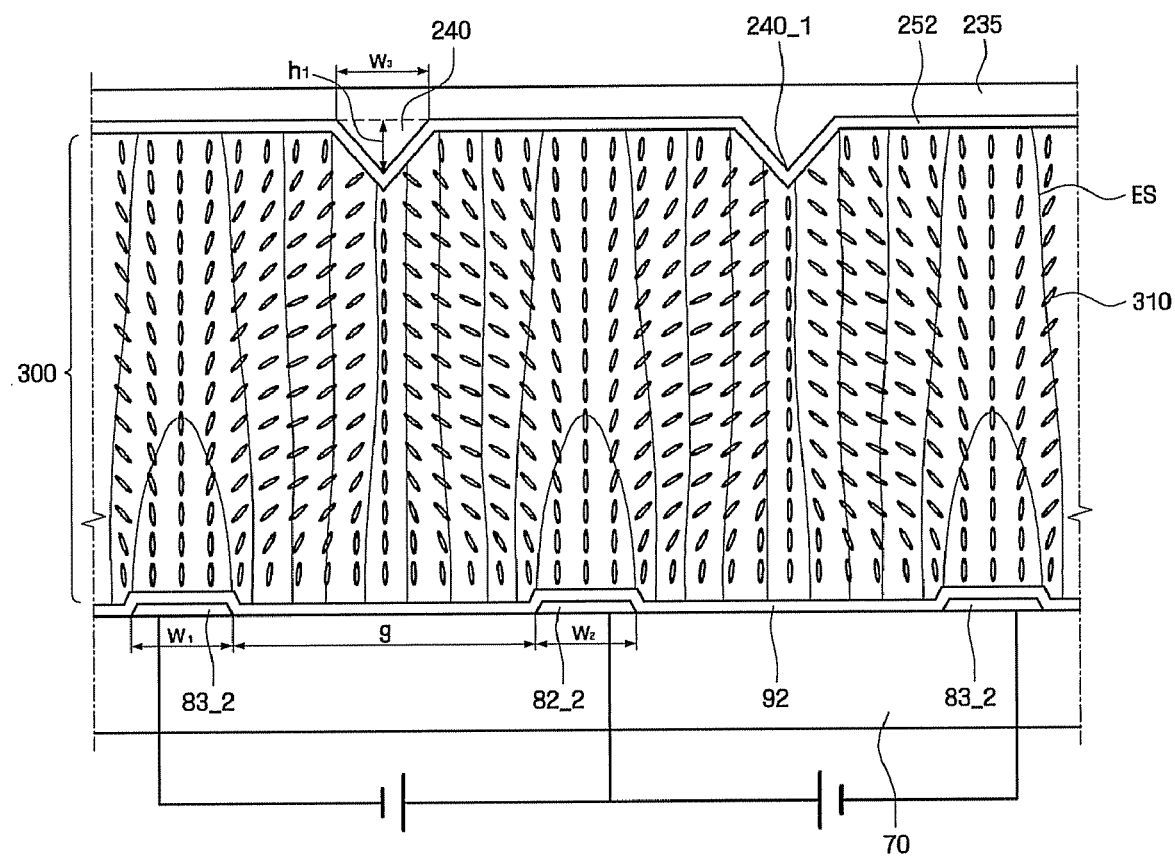
FIG. 4 is a schematic view showing the exemplary directions in which liquid crystal molecules are arranged when a driving voltage is applied to the exemplary LCD according to the first exemplary embodiment of the present invention.
Figure 5:
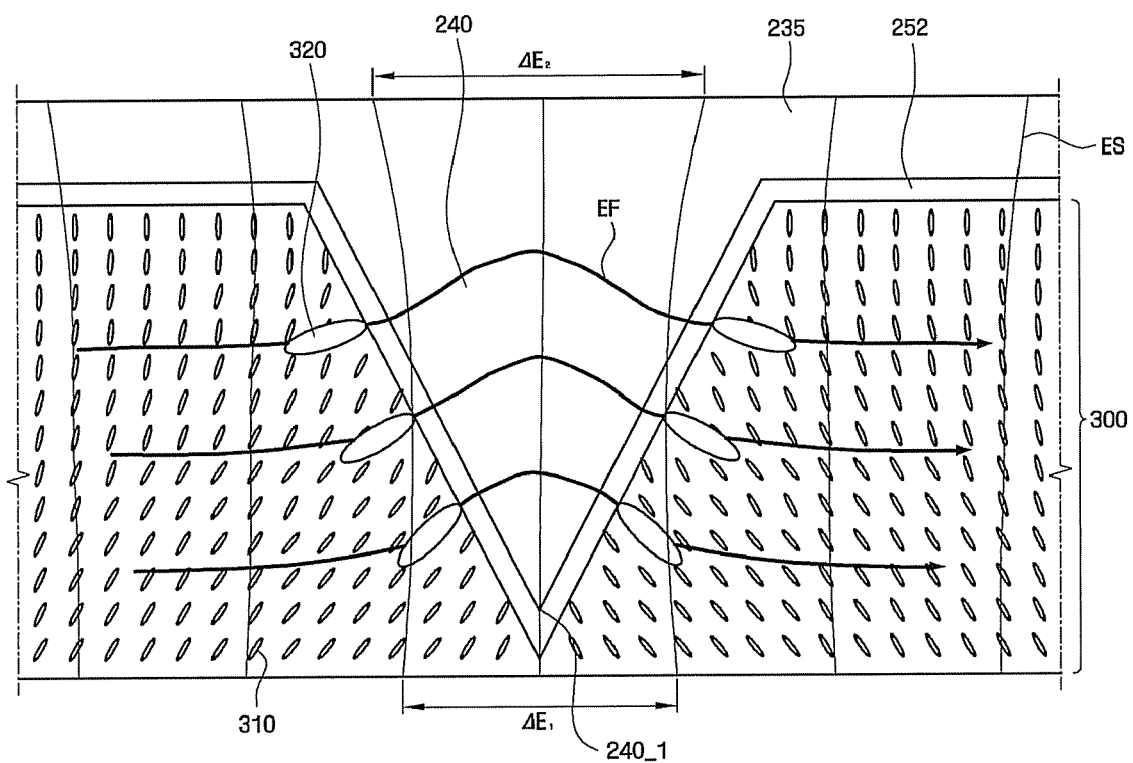
FIG. 5 is a schematic view showing the dielectric constant of an exemplary texture control portion included in the exemplary LCD according to the first exemplary embodiment of the present invention and the direction in which the liquid crystal molecules are arranged.

Hereinafter, the alignment of the liquid crystal molecules 310 and the function of the protrusion of the texture control portion 240 will be described in detail with reference to FIGS. 3 through 5. FIG. 3 is an enlarged view of portion B shown in FIG. 1. FIG. 4 is a schematic view showing the directions in which liquid crystal molecules 310 are arranged when a driving voltage is applied to the exemplary LCD according to the first exemplary embodiment of the present invention. FIG. 5 is a schematic view showing the dielectric constant of the exemplary texture control portion 240 included in the exemplary LCD according to the first exemplary embodiment of the present invention and the directions in which the exemplary liquid crystal molecules 310 are arranged.

Referring to FIGS. 3 and 4, when a driving voltage is applied to the LCD according to the first exemplary embodiment, a parabolic electric field is formed between the first and second linear electrode patterns 82_2 and 83_2. In this case, since the liquid crystal molecules 310 have positive dielectric anisotropy, main directors of the liquid crystal molecules 310 are aligned parallel to the parabolic electric field. Accordingly, the liquid crystal molecules 310 are vertically aligned above the first and second linear electrode patterns 82_2 and 83_2. That is, the longitudinal axes of the liquid crystal molecules 310 above the first and second linear electrode patterns 82_2 and 83_2 are substantially perpendicular to above the first and second linear electrode patterns 82_2 and 83_2. In the gap g between the first and second linear electrode patterns 82_2 and 83_2, the liquid crystal molecules 310 are aligned according to the slopes of the parabolic electric field.

As shown in FIG. 3, the liquid crystal molecules 310 are aligned in opposite directions from the center of the gap g to form two self-domains in opposite directions. That is, if the first and second linear electrode patterns 82_2 and 83_2 are bar-shaped, the liquid crystal molecules 310 may be split into two domains as indicated by arrows in opposite directions. Meanwhile, at the center of the gap g, that is, at the boundary between the two domains, the liquid crystal molecules 310 aligned in opposite directions from the boundary of the domains collide with each other, thereby creating texture. That is, the liquid crystal molecules 310 at the center of the gap g are vertically aligned and seen as black bright lines. The texture may not only be created at the center of the gap g, but may also be concentrated in a region, in which one of the first and second linear electrode patterns 82_2 and 83_2 due to, for example, the spacer between the TFT display substrate 100 and the color filter display substrate 200. Irregular texture, for example, texture concentrated in a particular region, may increase the response time of the LCD and cause the generation of an afterimage. The texture control portion 240 can prevent such irregular texture.

As described above, the texture control portion 240 according to the present exemplary embodiment may be a protrusion protruding from the overcoat layer 235 toward the liquid crystal layer 300. The cross section of the protrusion may become narrower from the second insulation substrate 210 toward the liquid crystal layer 300, that is, as a distance increases from the second insulation substrate 210. Specifically, the cross section of the protrusion may be polygonal such as triangular or trapezoidal, circular, lenticular, or the like. However, the shape of the cross section of the protrusion is not limited thereto. Hereinafter, a case where the cross section of the protrusion is triangular will be described as an example.

The vertical alignment film 252 is formed on the protrusion. Accordingly, the liquid crystal molecules 310 are aligned perpendicular to the protrusion when the driving voltage is applied to the LCD. Specifically, the liquid crystal molecules 310 are vertically aligned at a center 240_1 of the texture control portion 240, that is, at the vertex of the triangular protrusion, and are aligned perpendicular to both sides of the triangular protrusion. Therefore, the liquid crystal molecules 310 are, on the whole, aligned perpendicular to an equipotential surface. That is, as shown in FIG. 4, the liquid crystal molecules 310 are vertically aligned in areas of the liquid crystal layer 300 corresponding to the first and second linear electrode patterns 82_2 and 83_2 and the center 240_1 of the texture control portion 240. In addition, since the texture of the liquid crystal molecules 310 is fixed to the center 240_1 of the texture control portion 240, the boundary between the two self-domains is fixed to the center 240_1.

In order to increase the response speed of the liquid crystal molecules 310, the distance between the texture control portion 240 and the first linear electrode patterns 82_2 may be substantially equal to the distance between the texture control portion 240 and the second linear electrode patterns 83_2. In other words, the texture control portion 240 is centrally located between the first linear electrode patterns 82_2 and the second linear electrode patterns 83_2. That is, when a position to which texture is fixed is where the gap g between the first and second linear electrode patterns 82_2 and 83_2 is divided into two domains, the response speed of the liquid crystal molecules 310 can be increased. In addition, since the liquid crystal molecules 310 are vertically aligned and viewed as black in the regions where the first and second linear electrode patterns 82_2 and 83_2 are formed, each of respective widths $w_2$ and $w_1$ of the first and second linear electrode patterns 82_2 and 83_2 may be about 3 to about 5 μm. The gap g between the first and second linear electrode patterns 82_2 and 83_2 may be about 5 to about 13 μm. In addition, a height $h_1$ of the texture control portion 240 may be about 0.1 to about 1 μm in consideration of the alignment of the liquid crystal molecules 310.

Hereinafter, the dielectric constant of the texture control portion 240 will be described with reference to FIGS. 4 and 5. As described above, a parabolic electric field EF is formed between the first and second linear electrode patterns 82_2 and 83_2 of the LCD according to the present exemplary embodiment. In addition, the equipotential surface ES is perpendicular to the electric field. If the dielectric constant of the protrusion of the texture control portion 240 is higher than a horizontal dielectric constant of the liquid crystal molecules 310, a voltage drop in the protrusion is smaller than that in the liquid crystal layer 300. Accordingly, an equipotential gap $\Delta E_2$ of the protrusion is wider than an equipotential gap $\Delta E_1$ of the liquid crystal layer 300. Consequently, the direction of the electric field EF in the protrusion becomes a direction indicated by an arrow. That is, the electric field EF in the protrusion protrudes higher than the electric field EF in the liquid crystal layer 300. In addition, the direction in which the liquid crystal molecules 310 are arranged according to the electric field EF formed by the protrusion having a high dielectric constant roughly matches the direction in which the liquid crystal molecules 310 are arranged according to the electric field formed by the first and second electrode patterns 82_2 and 83_2. Thus, texture can be controlled more easily. The dielectric constant of the protrusion may be, for example, about 2 to about 10 $C^2/Nm^2$.

Figure 6:
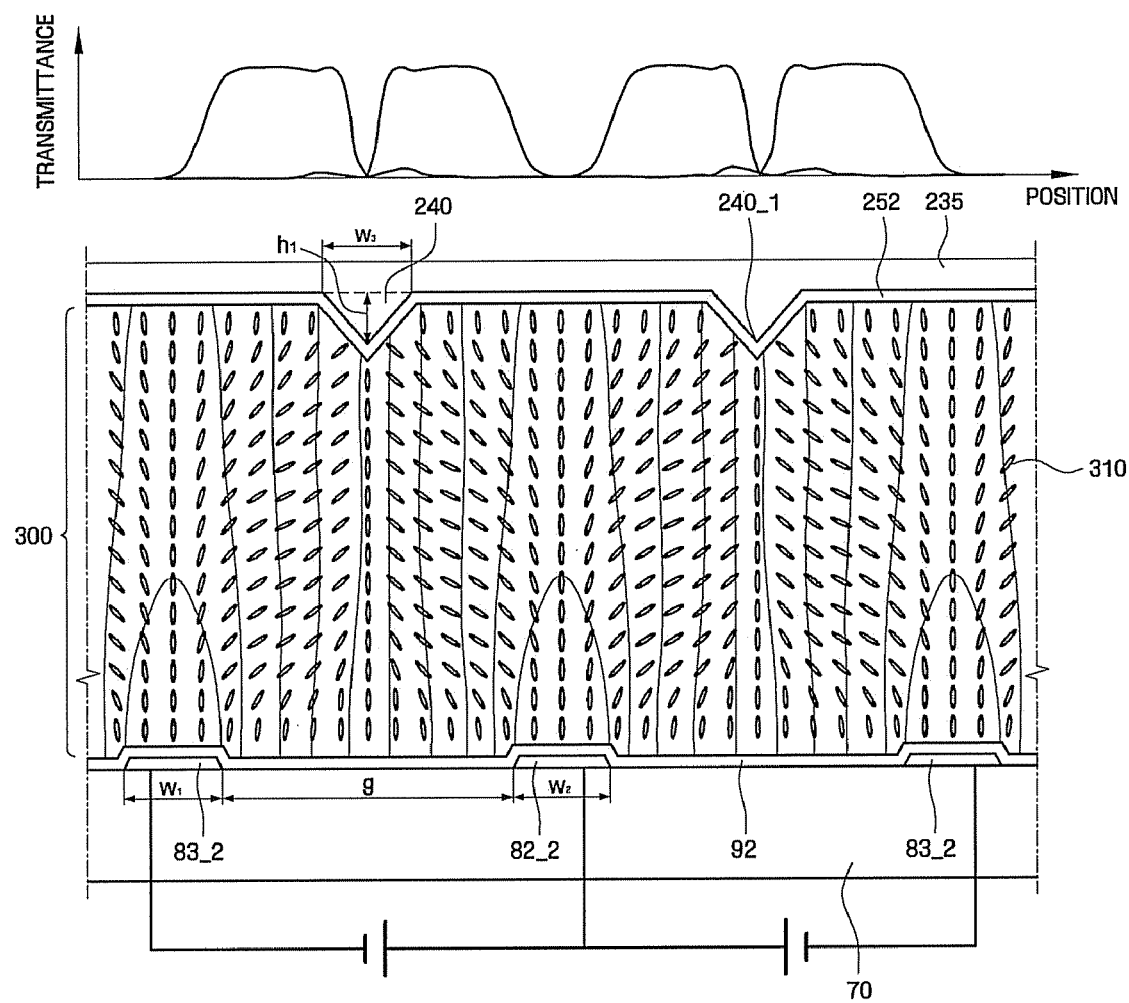
FIG. 6 is a schematic view showing transmittance with respect to position in the exemplary LCD according to the first exemplary embodiment of the present invention.

Hereinafter, the transmittance and the response speed of the LCD according to the first exemplary embodiment of the present invention will be dealt with. FIG. 6 is a schematic view showing transmittance with respect to position in the exemplary LCD according to the first exemplary embodiment of the present invention.

FIG. 6 shows a graph of transmittance with respect to the position of a device in the exemplary LCD when the cell gap is 4.1 μm, the voltage is 12 V, the widths $w_2$ and $w_1$ of the first and second linear electrode patterns 82_2 and 83_2 are 3 to 4 μm, the gap g between the first and second linear electrode patterns 82_2 and 83_2 is 12 μm, $\Delta \in$ of liquid crystals is 9 $C^2/Nm^2$, rotation viscosity is 80 mPas, and the dielectric constant of the protrusion is 6.6 $C^2/Nm^2$, where $\Delta \in$ indicates the difference between a horizontal dielectric constant and a vertical dielectric constant. Referring to FIG. 6, lowest transmittance is detected at the center 240_1 of each texture control portion 240. This indicates that the texture of the liquid crystal molecules 310 is accurately fixed to the center 240_1 of the texture control portion 240. Meanwhile, the response speed of the LCD having the protrusion has increased by about 12 percent as compared to an LCD without the protrusion. That is, since the texture of the LCD according to the present embodiment is controlled by the protrusion of the texture control portion 240, the response speed of the LCD can be increased.

A backlight assembly having a plurality of lamps is implemented under the TFT display substrate 100, the color filter display substrate 200, and the liquid crystal layer 300 interposed therebetween to complete the LCD according to the first exemplary embodiment.

Figure 7:
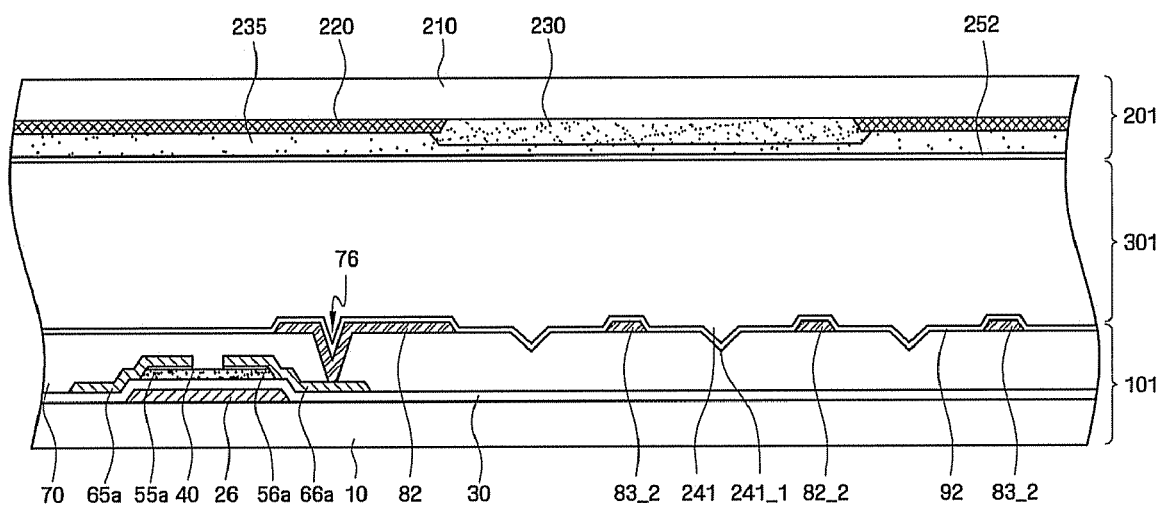
FIG. 7 is a cross-sectional view of an exemplary LCD according to a second exemplary embodiment of the present invention.

Hereinafter, an LCD according to a second exemplary embodiment of the present invention will be described in detail with reference to FIG. 7. FIG. 7 is a cross-sectional view of an exemplary LCD according to a second exemplary embodiment of the present invention. In the following exemplary embodiments, elements substantially identical to those of the first exemplary embodiment are indicated by like reference numerals, and thus their description will be omitted or simplified.

Referring to FIG. 7, a TFT display substrate 101 according to the present exemplary embodiment includes a texture control portion 241 formed in a passivation layer 70. That is, unlike in the previous exemplary embodiment, in the present exemplary embodiment, the texture control portion 241 is formed in the TFT display substrate 101 instead of a color filter display substrate 201.

As in the previous exemplary embodiment, the passivation layer 70 according to the present exemplary embodiment may be made of an organic or inorganic material such as silicon nitride or silicon oxide.

In the present exemplary embodiment, the texture control portion 241 may be a groove patterned in the passivation layer 70. That is, the texture control portion 241 may be a groove formed by patterning the passivation layer 70 to a predetermined depth (indicated by reference character $d_1$ in FIGS. 8 and 9). The groove may be bar-shaped and parallel to adjacent first and second linear electrode patterns 82_2 and 83_2. The alignment of liquid crystal molecules 311 in the liquid crystal layer 301 may be different from the previous exemplary embodiment depending on the shape of the groove. The desirable shapes and conditions of the groove will be described in detail later.

Figure 8:
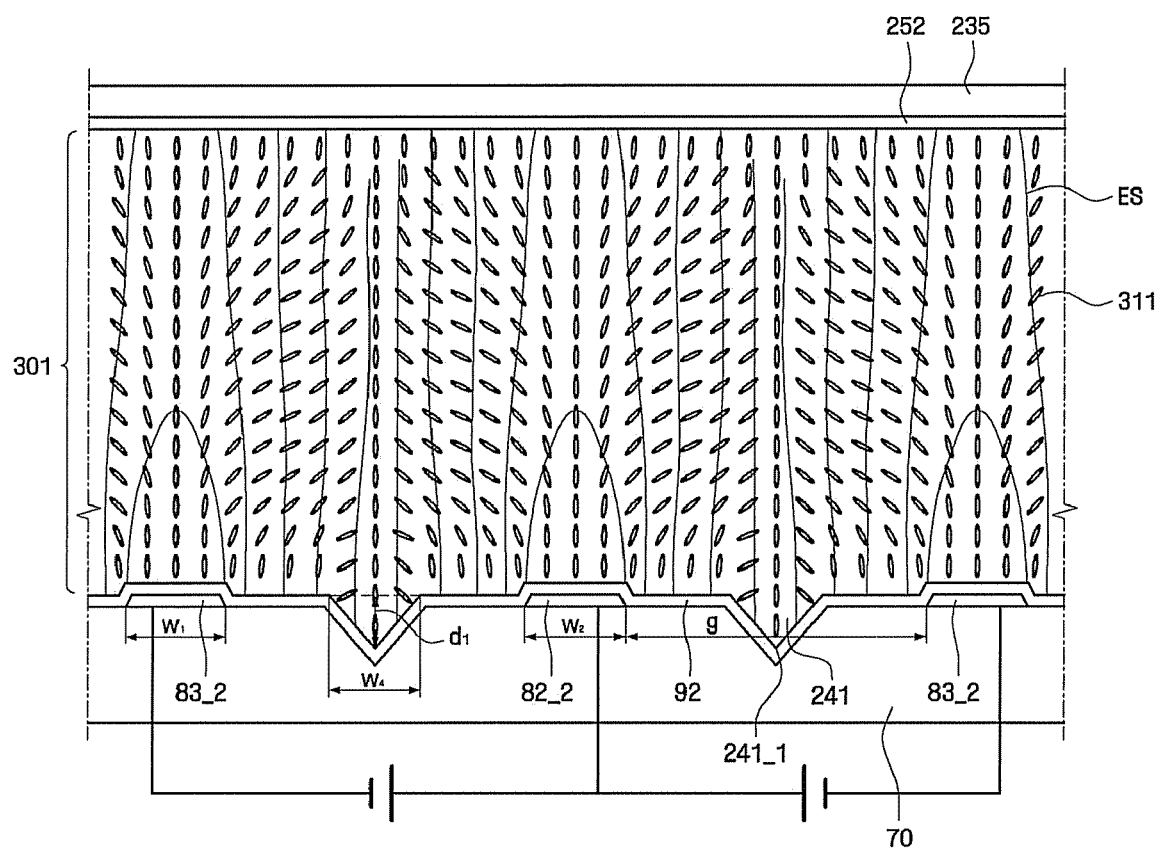
FIG. 8 is a schematic view showing the exemplary directions in which liquid crystal molecules are arranged when a driving voltage is applied to the exemplary LCD according to the second exemplary embodiment of the present invention.
Figure 9:
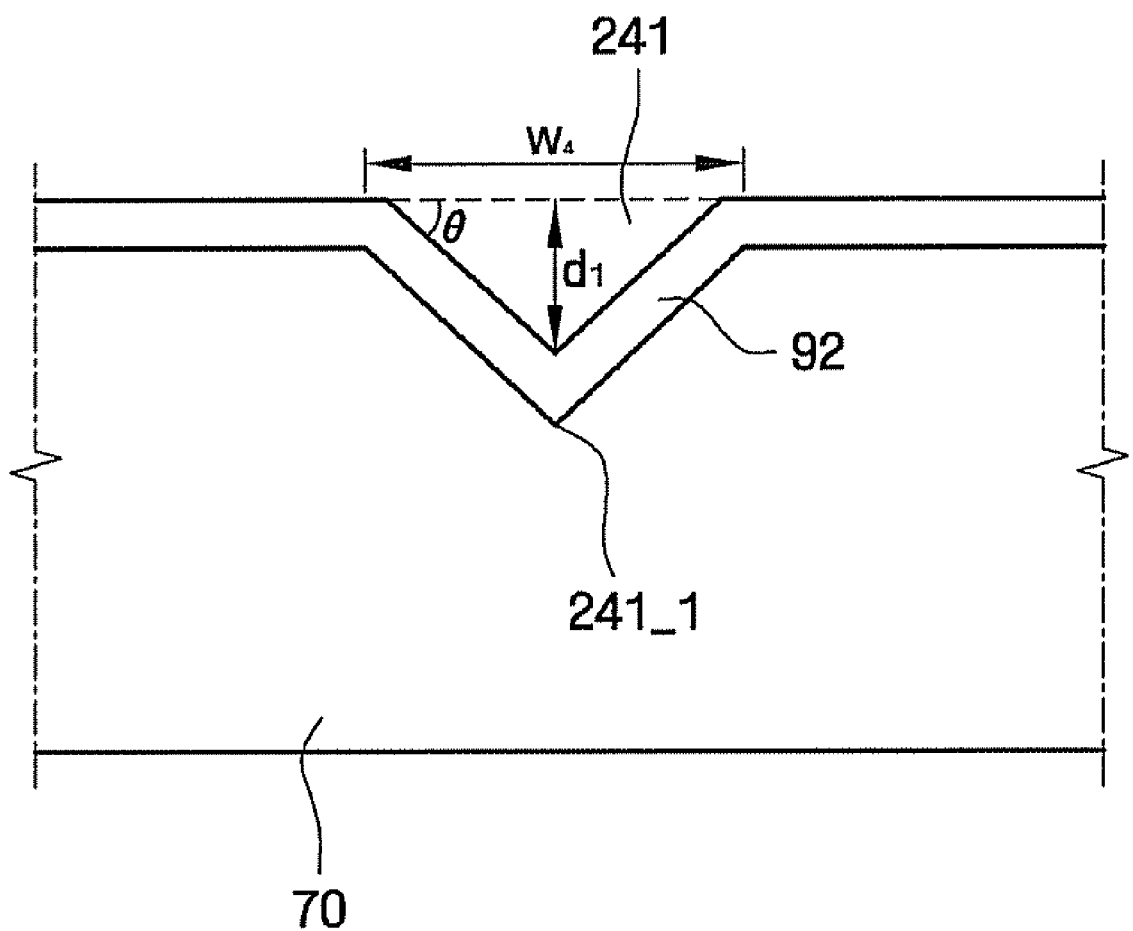
FIG. 9 is a schematic diagram showing the depth and angle of an exemplary texture control portion included in the exemplary LCD according to the second exemplary embodiment of the present invention.

Hereinafter, the position and shape of the groove and the alignment of the liquid crystal molecules according to the position and shape of the groove according to the present exemplary embodiment will be described in detail with reference to FIGS. 8 and 9. FIG. 8 is a schematic view showing the directions in which liquid crystal molecules 311 are arranged when a driving voltage is applied to the exemplary LCD according to the second exemplary embodiment of the present invention. FIG. 9 is a schematic diagram showing the depth and angle of the texture control portion 241 included in the exemplary LCD according to the second exemplary embodiment of the present invention.

Referring to FIG. 8, the texture control portion 241 according to the present exemplary embodiment may be a groove formed by patterning the passivation layer 70 to a predetermined depth. The cross section of the groove may become wider from a first insulation substrate 10 toward the liquid crystal layer 301. That is, the groove may become wider as a distance increases from the insulation substrate 10. Specifically, the cross section of the groove may be polygonal such as triangular or trapezoidal, circular, lenticular, or the like. However, the shape of the cross section of the groove is not limited thereto. Hereinafter, a case where the cross section of the groove is triangular will be described as an example.

A vertical alignment film 92 is formed on the grooves of the texture control portions 241. Accordingly, the liquid crystal molecules 311 are aligned perpendicular to the groove when the driving voltage is applied to the LCD. Specifically, the liquid crystal molecules 311 are vertically aligned at a center 241_1 of the texture control portion 241, that is, at the vertex of the triangular groove, and are aligned perpendicular to both sides of the triangular groove. Therefore, the liquid crystal molecules 311 are, on the whole, aligned perpendicular to an equipotential surface ES. That is, the liquid crystal molecules 311 are vertically aligned in the first and second linear electrode patterns 82_2 and 83_2 and at the center 241_1 of the texture control portion 241. In addition, since the texture of the liquid crystal molecules 311 is fixed to the center 241_1 of the texture control portion 241, the boundary between two self-domains is fixed to the center 241_1.

In order to increase the response speed of the liquid crystal molecules 311, the distance between the texture control portion 241 and the first linear electrode patterns 82_2 may be substantially equal to the distance between the texture control portion 241 and the second linear electrode patterns 83_2. That is, when a position to which texture is fixed is where a gap g between the first and second linear electrode patterns 82_2 and 83_2 is divided into two domains, the response speed of the liquid crystal molecules 310 can be increased. In addition, respective widths $w_2$ and $w_1$ of the first and second linear electrode patterns 82_2 and 83_2 and the gap g between the first and second linear electrode patterns 82_2 and 83_2 may be equal to those in the previous exemplary embodiment.

Referring to FIGS. 8 and 9, a maximum width $w_4$ of the texture control portion 241, that is, a maximum width of the cross section of the groove, may be about 3 μm or greater. The maximum width $w_4$ of the texture control portion 241 may be narrower than the gap g between the first and second linear electrode patterns 82_2 and 83_2. In this case, a depth $d_1$ of the texture control portion 241 controls an angle of inclination θ of the texture control portion 241, that is, an angle formed by the passivation layer 70 and the texture control portion 241, to be about 1 to about 45 degrees.

If the texture control portion 241 according to the present exemplary embodiment is wide as described above, the response speed of the LCD may not be reduced even when the position of the texture control portion 241 is changed due to misalignment, which will be described later. If the angle of inclination θ of the texture control portion 241 is about 45 degrees or less, a reduction in contrast ratio due to initial leakage of light even when no driving voltage is applied to the LCD can be prevented. When the angle of inclination θ of the texture control portion 241 is about 1 degree or greater, the response speed of the LCD can be increased.

Figure 10:
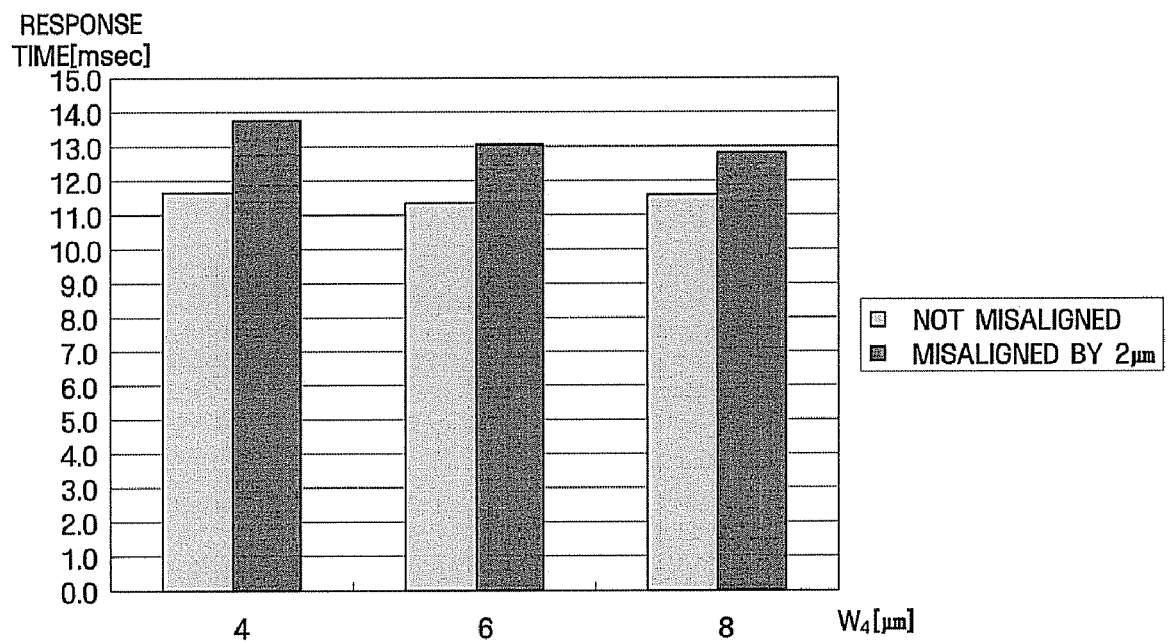
FIG. 10 is a graph showing the results of experiments conducted to determine a desirable width of the exemplary texture control portion included in the exemplary LCD according to the second exemplary embodiment of the present invention.

The width $w_4$ and angle of inclination θ of the texture control portion 241 which may contribute to an increase in the response speed of the LCD will be identified with reference to FIGS. 9 and 10 and Table 1. FIG. 10 is a graph showing the results of experiments conducted to determine a desirable width of the texture control portion 241 included in the exemplary LCD according to the second exemplary embodiment of the present invention.

TABLE 1

| Width ($w_4$) | Depth ($d_1$) | Angle of Inclination (θ) | Misaligned by (μm) | Response Time (msec) |
|---|---|---|---|---|
| 4 | 0.5 | 14.04 | 0 | 11.9 |
| 4 | 1 | 26.57 | 0 | 11.7 |
| 4 | 2 | 45.00 | 0 | 11.9 |
| 6 | 0.5 | 9.46 | 0 | 11.9 |
| 6 | 1 | 18.43 | 0 | 11.4 |
| 6 | 2 | 33.69 | 0 | 13.6 |
| 8 | 0.5 | 7.13 | 0 | 12.0 |
| 8 | 1 | 14.04 | 0 | 11.6 |
| 8 | 2 | 26.57 | 0 | 13.9 |
| 4 | 0.5 | 14.04 | 2 | 14.0 |
| 4 | 1 | 26.57 | 2 | 13.8 |
| 4 | 2 | 45.00 | 2 | 14.1 |
| 6 | 0.5 | 9.46 | 2 | 13.1 |

TABLE 1-continued

| Width ($w_4$) | Depth ($d_1$) | Angle of Inclination (θ) | Misaligned by (μm) | Response Time (msec) |
|---|---|---|---|---|
| 6 | 1 | 18.43 | 2 | 13.1 |
| 6 | 2 | 33.69 | 2 | 15.7 |
| 8 | 0.5 | 7.13 | 2 | 13.0 |
| 8 | 1 | 14.04 | 2 | 12.8 |
| 8 | 2 | 26.57 | 2 | 14.8 |

As shown in Table 1, even when the angle of inclination θ of the texture control portion 241 is small, the response time of the LCD hardly increases. Therefore, the LCD has high response speed.

Referring to FIG. 10 and Table 1, as the width $w_4$ of the texture control portion 241 is increased from 4 to 8 μm, an increase in the response time of the LCD is reduced when the texture control portion 241 is misaligned by 2 μm. That is, it can be understood from Table 1 and FIG. 10 that it is desirable for the width $w_4$ of the texture control portion 241 to be wide and for the angle of inclination θ to be about 45 degrees or less.

Figure 11:
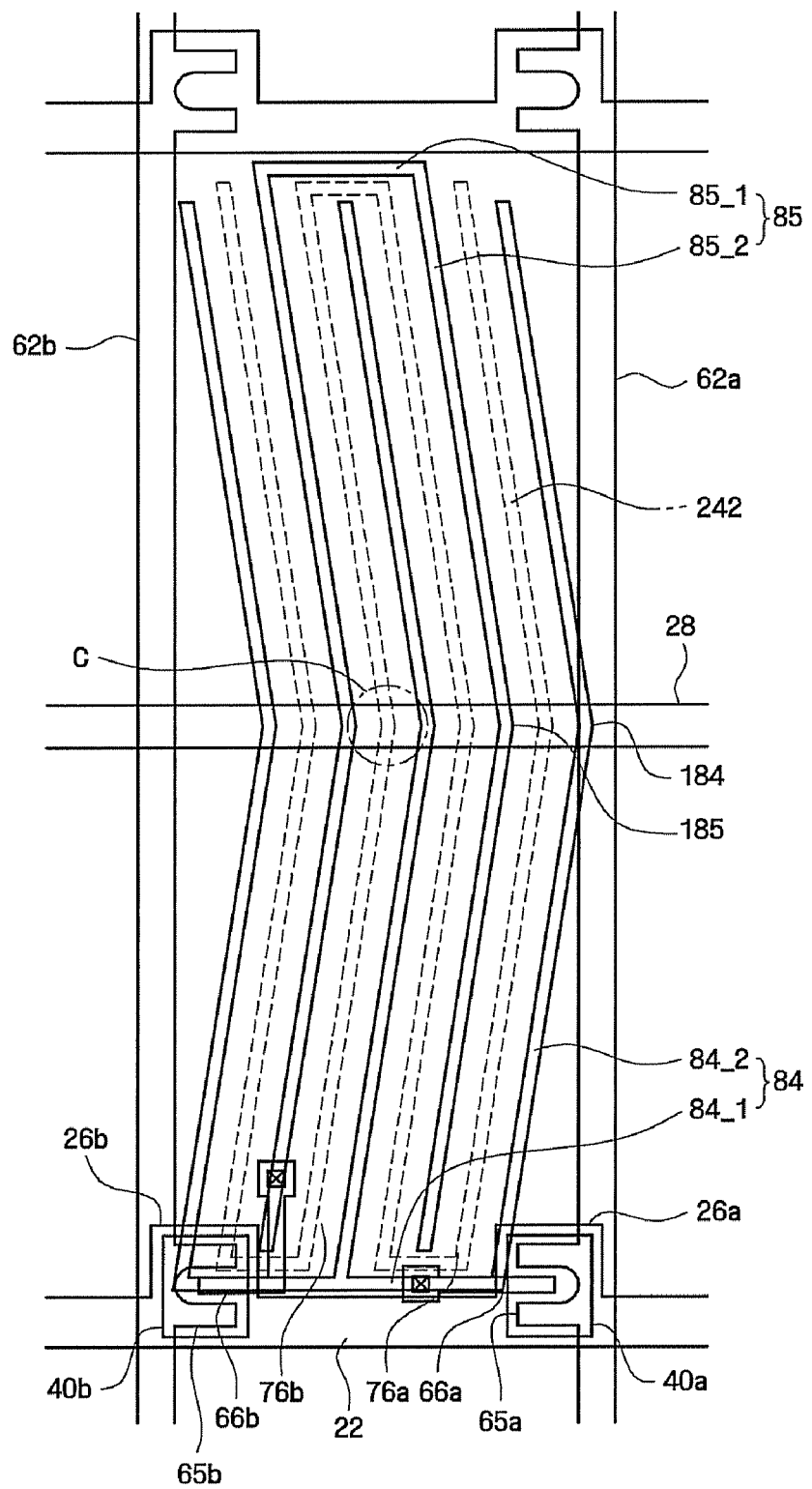
FIG. 11 is an arrangement plan of an exemplary LCD according to a third exemplary embodiment of the present invention.
Figure 12:
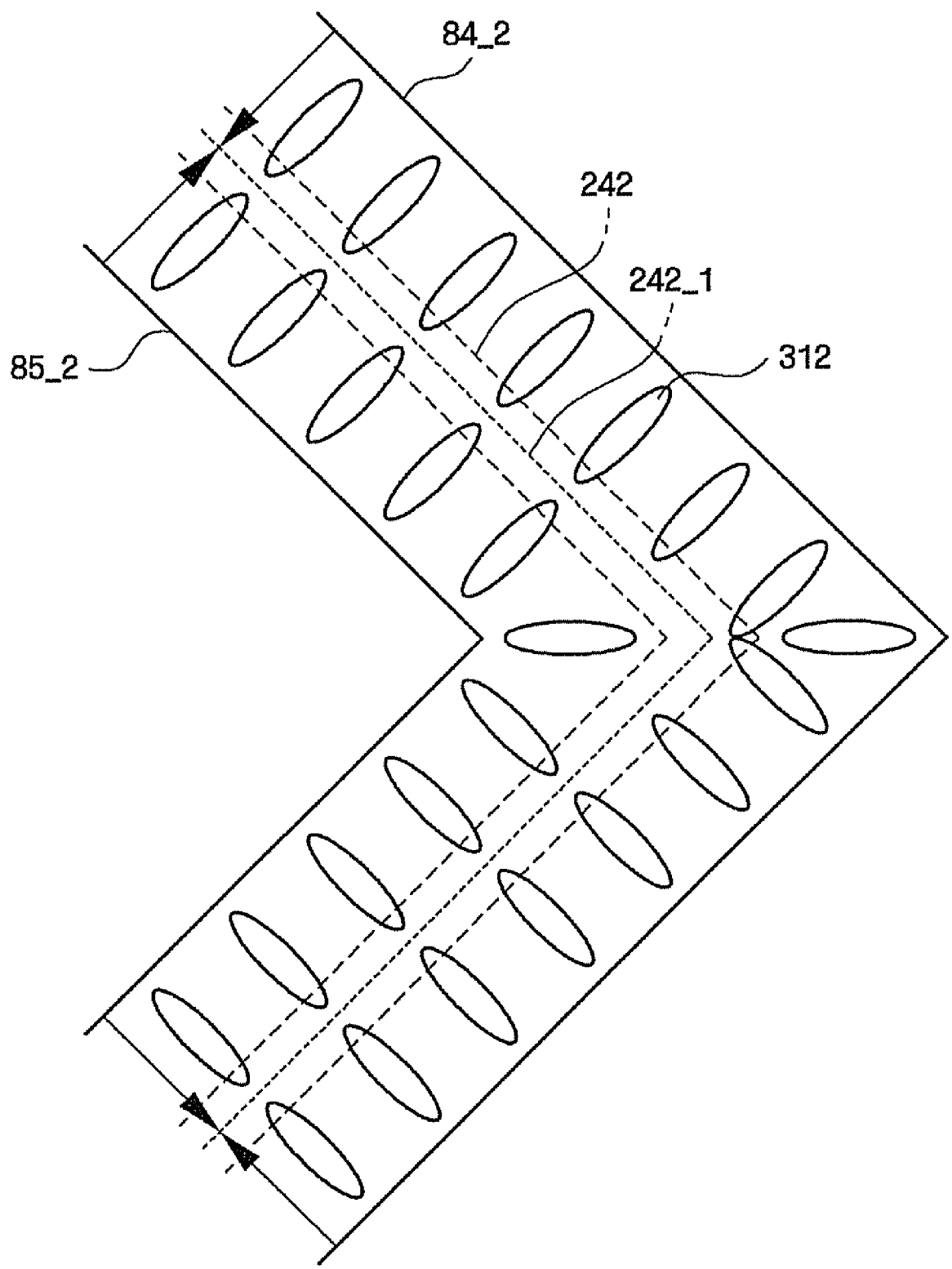
FIG. 12 is an enlarged view of portion C shown in FIG. 11.

Hereinafter, an exemplary LCD according to a third exemplary embodiment of the present invention will be described with reference to FIGS. 11 and 12. FIG. 11 is an arrangement plan of an exemplary LCD according to a third exemplary embodiment of the present invention. FIG. 12 is an enlarged view of portion C shown in FIG. 11.

Referring to FIG. 11, each of a pixel electrode 84 and a common electrode 85 according to the present exemplary embodiment includes at least one bent portion 184 or 185, respectively.

Specifically, the pixel electrode 84 according to the present exemplary embodiment includes a first connection pattern 84_1, which horizontally extends in a lower portion of a pixel region, such as extending in the first direction adjacent to the gate line 22, and a plurality of first linear electrode patterns 84_2 which branch out from the first connection pattern 84_1.

The first linear electrode patterns 84_2 branch out from the first connection pattern 84_1 to be at an angle of substantially 45 degrees with respect to a polarization axis of a polarizer (not shown) and are bent at a central area of the pixel region to be at an angle of substantially 135 degrees with respect to the polarization axis of the polarizer. In an exemplary embodiment, the bent portion 184 may overlap a storage wiring 28.

The common electrode 85 according to the present exemplary embodiment includes a second connection pattern 85_1, which horizontally extends in an upper portion of the pixel region, such as extending in the first direction adjacent to a gate line 22 of a previous row of pixels, and a plurality of second linear electrode patterns 85_2 which branch out from the second connection pattern 85_1.

The second linear electrode patterns 85_2 branch out from the second connection pattern 85_1 to be at an angle of substantially 135 degrees with respect to the polarization axis of the polarizer (not shown) and are bent at a central area of the pixel region to be at an angle of substantially 45 degrees with response to the polarization axis of the polarizer. In an exemplary embodiment, the bent portion 185 may overlap a storage wiring 28.

Each of the first and second linear electrode patterns 84_2 and 85_2 is shaped like English character "V" having the bent portions 184 or 185 at the vertex of the "V" shape. In the illustrated exemplary embodiment, the V shape of the first and second linear electrode patterns 84_2 and 85_2 is opened towards the second data line 62b, however the invention is not limited to such an arrangement. The first and second linear electrode patterns 84_2 and 85_2 are arranged alternately and parallel to each other at adjacent portions thereof A texture control portion 242 is disposed in a gap between the first and second linear electrode patterns 84_2 and 85_2. The texture control portion 242 may be a groove formed in a first insulation substrate (not shown), such as previously described in the second exemplary embodiment of the present invention, or a protrusion formed on a second insulation substrate (not shown), such as in the first exemplary embodiment of the present invention.

Referring to FIG. 12, liquid crystal molecules 312 according to the present exemplary embodiment are aligned in the first and second linear electrode patterns 84_2 and 85_2 in opposite directions from the texture control portion 242 to form four different self-domains.

In the present exemplary embodiment, texture is fixed to a center 242_1 of the texture control portion 242, and the four self-domains are formed by the bent portions 184 and 185. Therefore, the response speed of the liquid crystal molecules 312 can further be increased. The bent portion 184 of the pixel electrode 84 may be disposed opposite the bent portion 185 of the common electrode 85. Unlike in the drawing, more than one bent portion 184 or 185 may be formed within each first and second linear electrode pattern 84_2 and 85_2.

As described above, an LCD according to the present invention provides at least one of the following advantages. First, when a color filter display substrate includes a protrusion, texture can be efficiently controlled, and response speed can be increased.

Second, when a TFT display substrate includes a groove, texture can be efficiently controlled, and the response speed can be increased. Third, when the LCD includes a texture control portion and a bent portion, response speed thereof can be increased.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display comprising:
   first and second insulation substrates which are separated from each other and face each other;
   a liquid crystal layer which is interposed between the first and second insulation substrates and includes liquid crystal molecules;
   a pixel electrode which is disposed on the first insulation substrate and comprises a plurality of first linear electrode patterns;
   a common electrode which is disposed on the first insulation substrate and comprises a plurality of second linear electrode patterns, wherein each second linear electrode pattern of the plurality of second linear electrode patterns is separated from each corresponding first linear electrode pattern of the plurality of first linear electrode patterns by a predetermined gap defined by each second linear electrode pattern and each corresponding first linear electrode pattern; and
   a texture control portion which is formed on the first or second insulation substrate and is disposed in an area aligned with the gap,
   wherein the first and second linear electrode patterns are arranged in an alternating fashion, and
   wherein the first and second linear electrode patterns are disposed on a same layer.

2. The liquid crystal display of claim 1, wherein the texture control portion is a protrusion which protrudes from the second insulation substrate toward the liquid crystal layer.

3. The liquid crystal display of claim 2, wherein a dielectric constant of the texture control portion is higher than a horizontal dielectric constant of the liquid crystal layer.

4. The liquid crystal display of claim 3, wherein the dielectric constant of the texture control portion is about 2 to about 10 $C^2/Nm^2$.

5. The liquid crystal display of claim 2, wherein the texture control portion is made of an organic or inorganic material and is parallel to adjacent portions of the first and second linear electrode patterns.

6. The liquid crystal display of claim 5, wherein a distance between the texture control portion and the first linear electrode pattern is substantially equal to a distance between the texture control portion and the second liner electrode pattern.

7. The liquid crystal display of claim 2, wherein a height of the texture control portion is about 0.1 to about 1 µm.

8. The liquid crystal display of claim 2, wherein the texture control portion becomes narrower from the second insulation substrate toward the liquid crystal layer.

9. The liquid crystal display of claim 8, wherein a maximum width of the texture control portion is about 3 to about 5 µm.

10. The liquid crystal display of claim 2, further comprising a black matrix formed on the second insulation substrate, color filters formed in openings in the black matrix, and an overcoat layer formed on the black matrix and the color filters, wherein the protrusion is formed on the overcoat layer.

11. The liquid crystal display of claim 1, further comprising a passivation layer which is formed on the first insulation substrate, wherein the texture control portion is a groove patterned in the passivation layer.

12. The liquid crystal display of claim 11, wherein the passivation layer is made of an organic or inorganic material and the texture control portion is parallel to adjacent portions of the first and second linear electrode patterns.

13. The liquid crystal display of claim 11, wherein the texture control portion becomes wider from the first insulation substrate toward the liquid crystal layer.

14. The liquid crystal display of claim 13, wherein a maximum width of the texture control portion is about 3 µm or greater and less than a width of the gap.

15. The liquid crystal display of claim 13, wherein the texture control portion is at an angle of about 1 to about 45 degrees with respect to a surface of the passivation layer.

16. The liquid crystal display of claim 1, wherein a distance between adjacent first and second linear electrode patterns is about 5 to about 13 µm.

17. The liquid crystal display of claim 1, wherein a thickness of the liquid crystal layer is about 3 to about 5 µm.

18. The liquid crystal display of claim 1, further comprising a vertical alignment film which is formed on each of the first and second insulation substrates.

19. The liquid crystal display of claim 18, wherein the liquid crystal molecules have positive dielectric anisotropy.

20. The liquid crystal display of claim 1, further comprising:
   first data wiring which is formed on the first insulation substrate and provides a data voltage to the pixel electrode; and second data wiring which is formed on the first insulation substrate substantially parallel to the first data wiring and provides a common voltage to the common electrode.

21. The liquid crystal display of claim 20, wherein a difference between the data voltage and the common voltage is about 5 to about 15 V.

22. The liquid crystal display of claim 1, wherein the pixel electrode further comprises a first connection pattern which connects the first linear electrode patterns to one another, and the common electrode further comprises a second connection pattern which connects the second linear electrode patterns to one another.

23. The liquid crystal display of claim 22, wherein the first and second linear electrode patterns are bar-shaped and branch out from the first and second connection patterns, respectively.

24. The liquid crystal display of claim 22, wherein the first and second linear electrode patterns branch out from the first and second connection patterns, respectively, and each of the first and second linear electrode patterns comprises at least one bent portion.

25. A method of reducing response time of liquid crystal molecules in a liquid crystal display, the method comprising:

interposing the liquid crystal molecules between first and second insulation substrates;

disposing a pixel electrode on the first insulation substrate, the pixel electrode including a plurality of first linear electrode patterns;

disposing a common electrode on the first insulation substrate, the common electrode including a plurality of second linear electrode patterns, wherein each second linear electrode pattern of the plurality of second linear electrode patterns is separated from each corresponding first linear electrode pattern of the plurality of first linear electrode patterns by a gap defined by each second linear electrode pattern and each corresponding first linear electrode pattern and is arranged in an alternating fashion with the first linear electrode patterns; and, disposing a texture control portion in an area aligned with the gap on the first or second insulation substrate, wherein the liquid crystal molecules are arranged perpendicular to the texture control portion when driving voltage is applied to the liquid crystal display, and wherein the first and second linear electrade patterns are disposed on a same layer.

* * * * *